United States Patent
Laming et al.

(10) Patent No.: US 6,292,601 B1
(45) Date of Patent: *Sep. 18, 2001

(54) DISPERSION COMPENSATION IN OPTICAL FIBRE TRANSMISSION

(75) Inventors: Richard Ian Laming; Martin Cole; Laurence Reekie, all of Southampton (GB)

(73) Assignee: Pirelli Cavi E Sistemi S.p.A., Milan (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/860,996
(22) PCT Filed: Jan. 29, 1996
(86) PCT No.: PCT/GB96/00189
§ 371 Date: Oct. 17, 1997
§ 102(e) Date: Oct. 17, 1997
(87) PCT Pub. No.: WO96/23372
PCT Pub. Date:Aug. 1, 1996

(30) Foreign Application Priority Data

Jan. 27, 1995 (GB) .................................. 9501672

(51) Int. Cl.[7] ...................................................... G02B 6/28
(52) U.S. Cl. ............................................... 385/24; 385/37
(58) Field of Search .................................. 359/188, 173, 359/127, 130, 134, 161; 385/15, 24, 37

(56) References Cited

U.S. PATENT DOCUMENTS 5,673,129 * 9/1997 Mizrahi ................................. 359/124
5,701,188 * 12/1997 Shigematsu et al. ................. 359/161
5,867,304 * 2/1999 Galvanuskas et al. .............. 359/333

FOREIGN PATENT DOCUMENTS

2161612 * 1/1986 (GB).

OTHER PUBLICATIONS

Lauzon et al: "Implementation and characterzation of fiber Bragg gratings Linearly chirped by a temperature gradient". Optics Letters, vol. 19, No. 23. pp. 2027–2029, Sep. 1994.*
Garthe et al. Proceedings of ECOC' 94. 20th European Conference on Optical Communications, Firenze, Italy. pp. 11–14, Sep. 1994.*
Farre et al. IEEE Photonics Technology Letters. vol. 5, No. 4. pp. 425–427, Apr. 1993.*
B. Wedding et al., "Dispersion Supported Transmission at 10Gbit/s Via Up To 253km Of Standard Single–Mode Fibre," Proc., ECOC '93, Vol. 2, Paper TuC4.3, pp. 101–104 (1993).

(List continued on next page.)

*Primary Examiner*—Hung N. Ngo
(74) *Attorney, Agent, or Firm*—Finnegan, Henderson, Farabow, Garrett & Dunner, L.L.P.

(57) ABSTRACT

An optical fiber transmission system comprises an optical signal source operable to generate an optical signal at a predetermined bit rate and at a signal wavelength; an optical fiber transmission link connected at a first end to the signal source, the link having dispersion characteristics at the signal wavelength; an optical amplifier serially disposed in the link; and a signal receiver connected at the second end of the Lank; in which a grating is connected in the link, the grating being chirped by an amount providing at least partial compensation of the dispersion characteristics of the link, the compensation such as to provide a signal, at the second of the link, compatible with the sensitivity requirements of the receiver at the second end of the link.

13 Claims, 13 Drawing Sheets

OTHER PUBLICATIONS

R. I. Laming et al., "Transmission of 6ps Linear Pulses Over 50km of Standard Fibre Using Mid–Point Spectral Inversion to Eliminate Dispersion," IEEE Journal of Quantum Electronics, Vol. 3, No. 9, pp. 2114–2118 (1994).

M. Onishi et al., "High Performance Dispersion–Compensating Fiber and its Application to Upgrading of 1.31 $\mu$m Optimized System," Proc., ECOC '93, Vol. 2, paper WcC8.5, pp. 357–360 (1993).

R. Kashyap et al., "30ps Chromatic Dispersion Compensation of 400fs Pulses at 100Gbits/s in Optical Fibres Using an All Fibre Photoinduced Chirped Reflection Grating," Electronics Letters, Vol. 30, No. 13, pp. 1078–1080 (1994).

K. O. Hill et al., "Aperiodic In–Fiber Bragg Gratings For Optical Fiber Dispersion Compensation," OFC'94, Optical Fiber Communication, Technical Digest, PD2, pp. 17–20 (1994).

J.A.R. Williams, et al., "Fibre Dispersion Compensation Using a Chirped In–Fibre Bragg Grating," Electr. Lett., Vol. 30 (12), pp. 985–987 (1994).

B. Malo et al., "Dispersion Compensation of a 100 km, 10Gbit/s Optical Fiber Link Using a Chirped In–Fiber Bragg Grating With a Linear Dispersion Characteristic," Proceedings, ECOC '94, Vol. 4, pp. 23–26 (1994).

* cited by examiner

DISPERSION COMPENSATION IN OPTICAL FIBRE TRANSMISSION

The invention relates to dispersion compensation in optical fibre transmission.

Data transmission in optical fibres is generally limited by power loss and pulse dispersion. The advent of erbium-doped fibre amplifiers (EDFAs) has effectively removed the loss limitation for systems operating in the third optical communication window (around a wavelength of about 1.55 $\mu$m (micrometer)), leaving pulse dispersion as a serious limitation, especially in future high-capacity multi-wavelength optical networks.

More importantly, most fibre which has already been installed for telecommunication links (ie. standard non-dispersion shifted fibre) exhibits a dispersion zero around 1.3 $\mu$m and thus exhibits high (about 17 ps/nm.km (picosecond per nanometer-kilometer)) dispersion 1.55 $\mu$m. Upgrading this fibre to higher bit rates involves the use of EDFAs and a shift in operating wavelength to 1.55 $\mu$m where dispersion-compensation becomes a necessity.

Several techniques have been demonstrated including laser pre-chirping (reference 1—below), mid-span spectral-inversion (phase-conjugation) (reference 2—below), the addition of highly-dispersive compensating fibre (reference 3—below) and chirped fibre gratings (references 4 to 7—below). Chirped fibre gratings are of particular interest, since they are compact, low-loss and offer high negative-dispersion of arbitrary and tunable profile. In separate experiments 450 fs (femtosecond) pulses have been successfully reconstructed after transmission through 245m of fibre (reference 4—below), and gratings with dispersion equivalent to 20 km and 1 km of standard fibre have been fabricated (references 5 and 6—below). Whilst more recently a grating has been employed to compensate the dispersion of 160 km of standard fibre in a 10 Gbits$^{-1}$ (gigabits per second) externally modulated experiment (reference 7—below) although no information of the grating strength was given in this case.

It is a constant aim to improve dispersion compensation techniques in optical fibre transmission systems.

The article in IEEE Photonics Technology Letters, April 1993, USA, vol. 5, no. 4, pages 425–427, Farre J et al: "Design of bidirectional communication systems with optical amplifiers", discloses the use of optical amplifiers at various positions in an optical fibre link.

The article in Optics Letters, vol. 19, no. 23, Dec. 1, 1994, Washington US, pages 2027–2029, Lauzon et al: "Implementation and characterization of fiber Bragg gratings linearly chirped by a temperature gradient", discloses (as the title suggests) the manufacture of chirped fibre gratings by imposing a temperature gradient onto a fibre grating.

GB-A-2 161 612 discloses a chirped fibre grating for dispersion compensation in an optical fibre link.

This invention provides an optical transmitter for use with an optical fibre transmission link, the transmitter comprising:

a light source capable of direct or indirect modulation; and an optical amplifier;

characterised by:

a chirped grating to provide compensation for the dispersion characteristics of the link over the range of wavelengths of the modulated light source.

Preferably the optical amplifier is operable in a saturation mode.

It is advantageous to position the compensating grating at the input end of the link, since in this position the optical input signal is still relatively large and thus a relatively insignificant noise penalty is incurred. In addition, if the grating's (compensated) output is then routed to an optical amplifier operating in saturation, the amplifier's output power will be effectively unaltered by the presence of the compensating grating.

The skilled man will appreciate that the dispersion compensation in this context need not be complete, but simply that the non-linear response of the grating acts against the dispersion characteristics of the transmission link.

This invention also provides an optical fibre transmission system comprising:

an optical fibre transmission link; and an optical amplifier disposed at an input end of the link;

characterised by:

a chirped grating disposed at the input end of the link, the chirped grating providing compensation against the dispersion characteristics of the link.

The invention will now be described by way of example with reference to the accompanying drawings, throughout which like parts are referred to by like references, and in which:

FIG. 1 is a schematic diagram of a dispersion compensating optical fibre transmission system;

FIG. 2 schematically illustrates the spectrum of a DFB (distributed feedback) laser transmitter;

FIGS. 3a to 3c schematically illustrate the reflectivity spectra of a fibre grating as written (FIG. 3a), with a temperature gradient set to add to the existing chirp (FIG. 3b) and with a temperature gradient set to reverse the existing chirp (FIG. 3c).

FIGS. 4a to 4c schematically illustrate the time delay of the gratings of FIGS. 3a to 3c respectively;

FIGS. 5a and 5b schematically illustrate sampling oscilloscope traces of an approximately 10 ps, 0.318 nm spectral halfwidth signal after propagation through 50 km of standard fibre without compensation (FIG. 5a) and with compensation (FIG. 5b);

FIG. 6 schematically illustrates bit error rate (BER) curves for the system of FIG. 1;

FIG. 7 schematically illustrates a transmission penalty at a $10^{-9}$ BER as a function of span length with and without dispersion compensation; and FIGS. 8a to 8f schematically illustrate eye diagrams showing the different results obtained without (FIGS. 8a to 8c) and with FIGS. 8d to 8f) dispersion compensation.

Referring now to FIG. 1, in this embodiment a chirped fibre grating 10 was incorporated into a 2.5 Gbits$^{-1}$ directly-modulated system operating at 1536 nm. (However, in other embodiments and in the description below, an indirectly modulated transmitter could be used instead). As a consequence of the direct modulation the output of the DFB laser transmitter 20 was chirped and exhibited a 3 dB optical bandwidth of 0.1 nm and a 10 dB (decibel) bandwidth of 0.24 nm, ie equivalent to a 10 Gbit/s modulation signal.

The transmitter 20 was supplied with data from a commercial multiplexer (not shown) from a Phillips SDH (synchronous digital hierarchy) 2.5 Gbits$^{-1}$ system. The multiplexer combines 16 channels of data at 140 Mbits$^{-1}$ (megabits per second) up to a line rate of 2.5 Gbits$^{-1}$. In the absence of data on any channel, the multiplexer generates random data. Random data was input to the channels whilst, on the test channel, pseudorandom data at 140 Mbits$^{-1}$ with a $2^{23}-1$ pattern length (generated by a BER test set 110) was employed. However, in a real application, it will of course be appreciated that real input data would be supplied to the transmitter instead of the pseudorandom data from the BER test set.

The transmitter 20 consisted of a directly-modulated DFB laser with wavelength centred at 1536 nm and whose chirped output had a 3 dB bandwidth of 0.108 nm and 10 dB bandwidth of 0.24 nm. The spectral characteristics of the transmitter output are illustrated schematically in FIG. 2. As a consequence of this chirp (and the fibre dispersion) a penalty was observed for transmission distances in standard fibre in excess of a few tens of km.

The transmitter was followed by a single-stage, 980 nm-pumped erbium-doped power-amplifier 30 giving an output power of +12 dBm (decibels relative to 1 milliwatt) which was transmitted through standard fibre having lengths of 100, 143 and 200 km. In the latter case (as illustrated in FIG. 1), a dual-stage 980 nm-pumped line amplifier 40 giving an output power of +13 dBm was incorporated between two series connected 100 km lengths of fibre 50, 60.

The output of the link was coupled via a variable attenuator 70 to a commercial, Phillips, receiver and demultiplexer 80, the output of which was in turn passed to the BER test set 110 for BER measurement (by comparison with the test data supplied to the transmitter 20 by the BER generator 110).

Dispersion-compensation of the link was provided by incorporating the chirped fibre grating 10 between the transmitter 20 and the power amplifier 30. Since the grating 10 operates in reflection, an optical circulator 90 was included to convert it to a transmission device. The grating was connected to the circulator using so-called NTT FC/PC compatible connectors (not shown). However, to ensure successful operation, index matching liquid (not shown) was inserted in the connection to minimise reflections.

Power levels in the link are such that it is operating in the so-called linear regime, thus the dispersion compensation could in theory be performed at any location in the link. However it is advantageous to incorporate the grating in its present location (before the fibre lengths 50, 60) since the input signal to the power amplifier is still relatively large and thus a relatively insignificant noise penalty is incurred. In addition, since this amplifier 30 is then operating in saturation the output power will be effectively unaltered. Alternatively, if the dispersion compensation had been included immediately prior to the receiver a penalty would have been incurred due to its insertion loss.

The fibre grating was written using standard techniques with a frequency-doubled excimer laser in a germania-boron co-doped fibre (0.1 NA (numerical aperture), 1 $\mu$m $\lambda_{cutoff}$ (cutoff wavelength)). The grating was about 20 mm in length with an approximately Gaussian strength profile and about 70% peak reflectivity. In its "as-written" state it had some residual chirp and a measured bandwidth of about 0.2 nm. The grating was further chirped to a 3 dB bandwidth of about 0.3 nm by applying a linear temperature gradient. The temperature gradient could be applied to either add to or reverse the existing chirp.

Surprisingly superior performance was obtained when the temperature gradient was applied to reverse the existing chirp of the grating. This was due to the slightly non-linear characteristics of the existing chirp.

In other words, the chirped optical fibre grating is formed by applying a temperature gradient to a portion of optical fibre on which a non-linear grating is impressed, the variation induced by the temperature gradient acting against the non-linear variation of the impressed grating, and in particular where the temperature gradient at least negates the non-linear variation of the impressed grating, thereby generating a grating having a non-linear variation in the opposite sense to the impressed grating.

Figure 1:
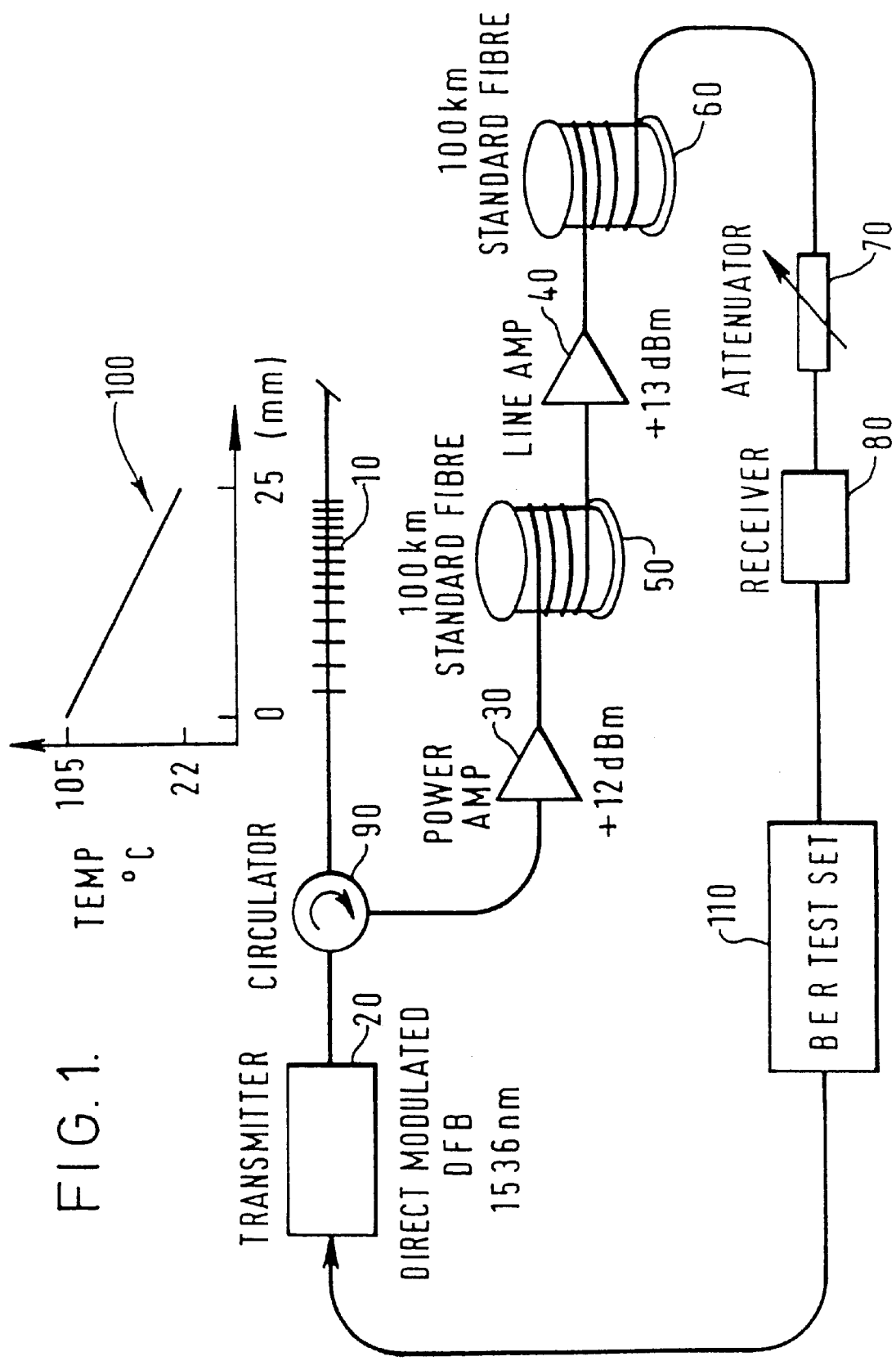
Figure 2:
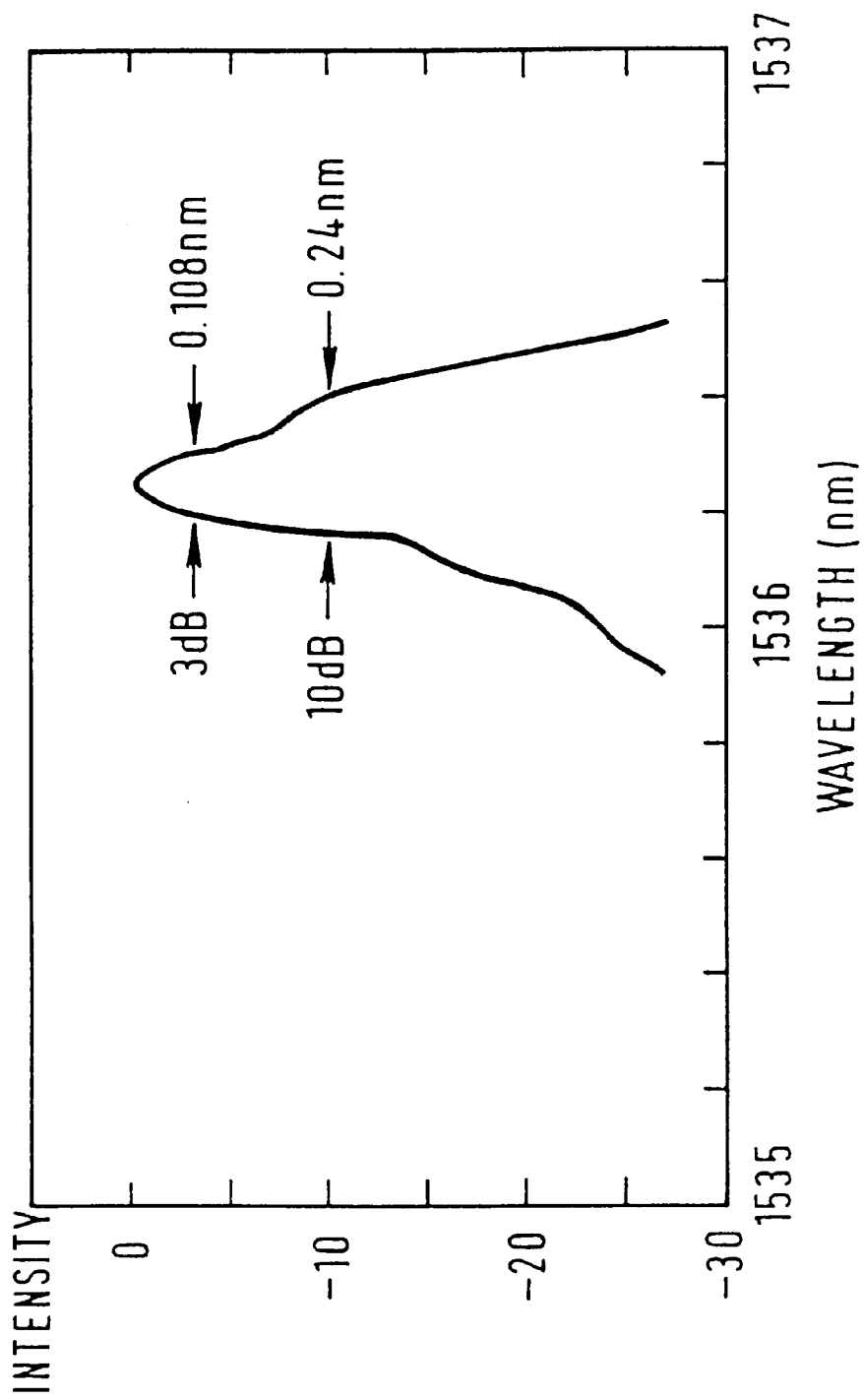
Figure 4A:
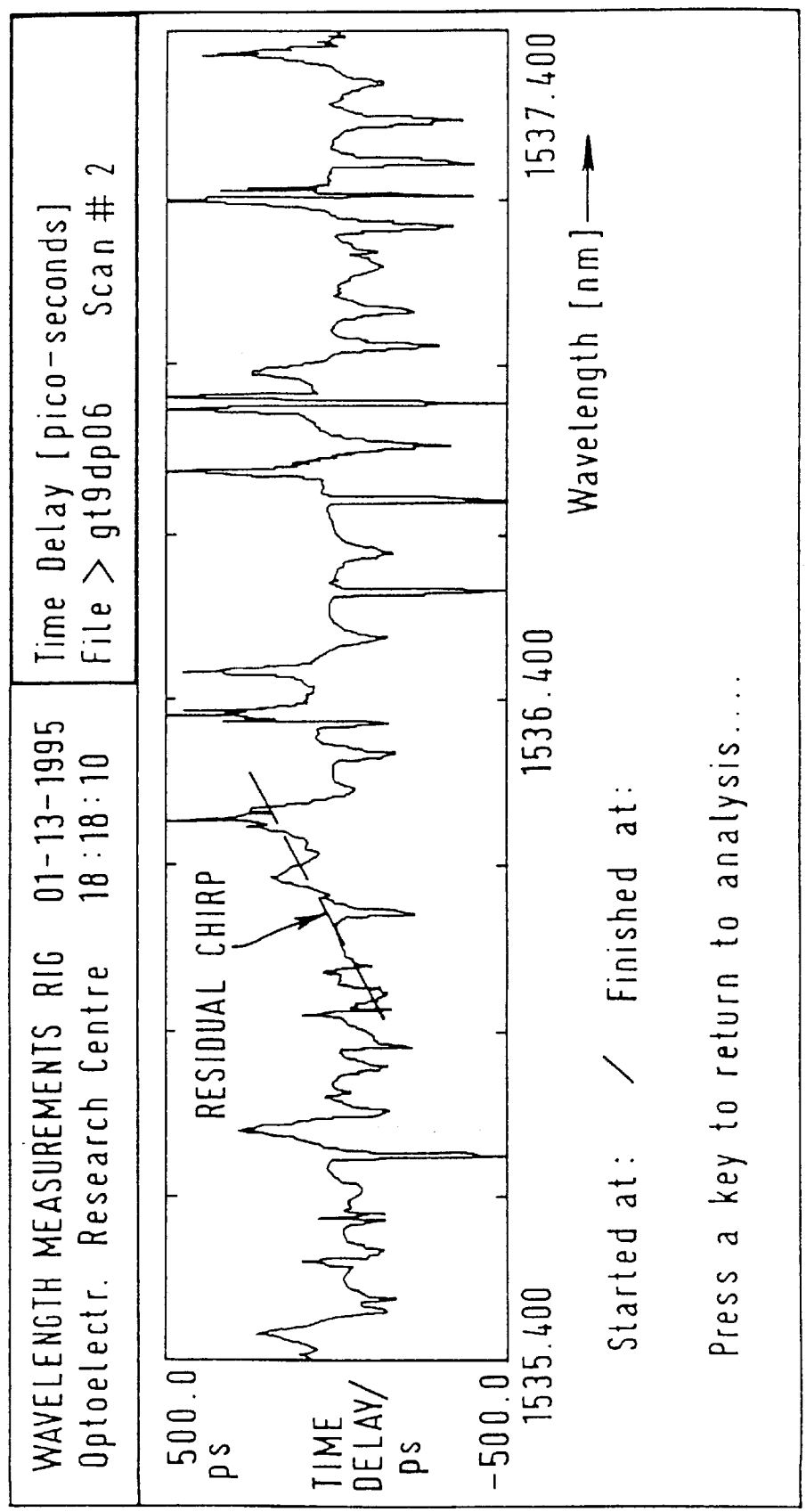
FIGS. 4a to 4c show the time delay of the gratings, measured using an standard interferometric set up, corresponding to the respective cases illustrated in FIGS. 3a to 3c. (Since the measurements were performed on different instruments there is a slight mismatch in indicated wavelengths.
Figure 4B:
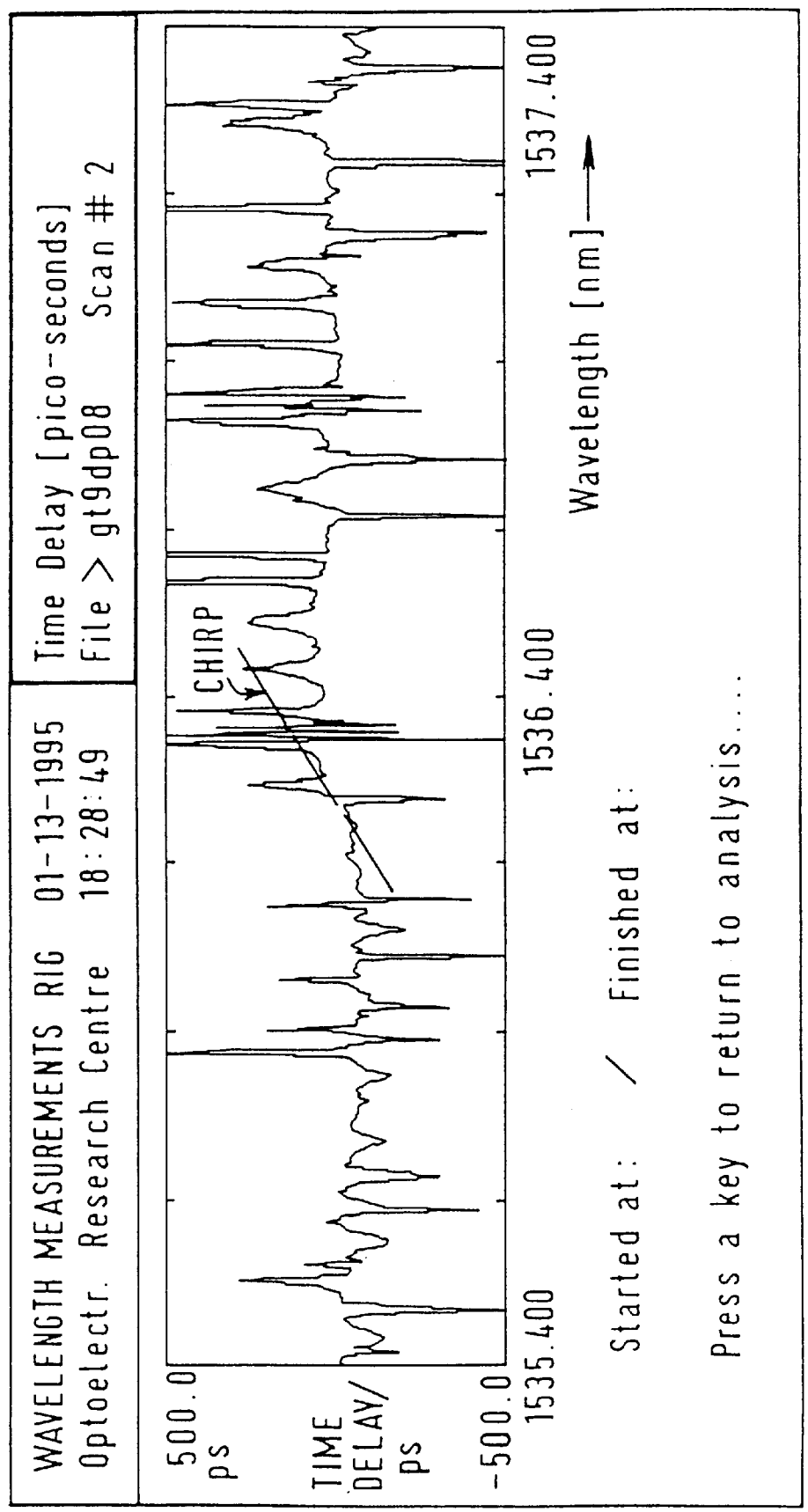

Also, all three measurements were taken from the same end of the grating and thus in the grating of FIG. 4b the grating was tested by the interferometer in the opposite direction to its direction of use in the embodiment of FIG. 1).

Figure 3A:
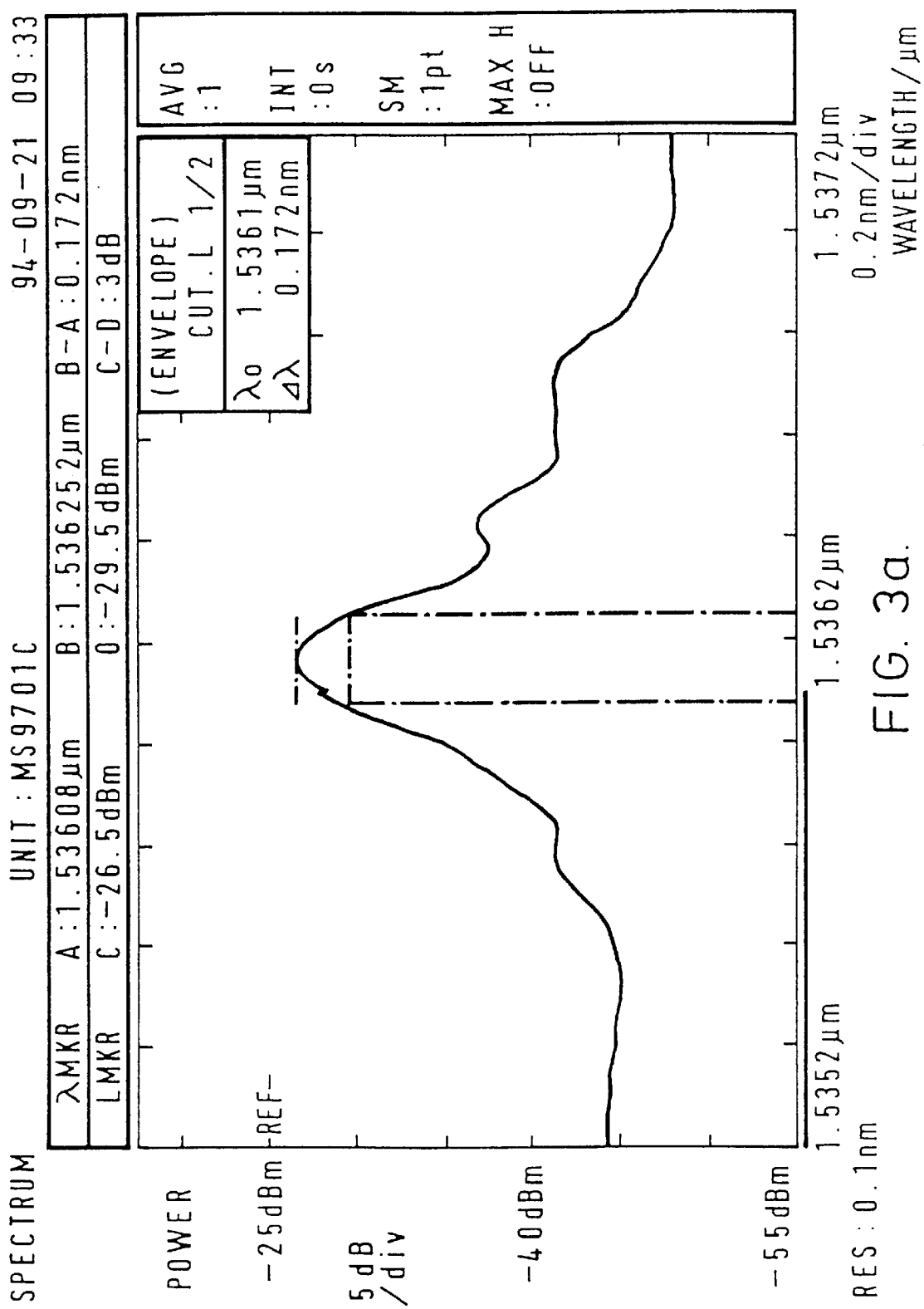
FIGS. 3a to 3c show the grating spectral response as written (FIG. 3a), with the temperature gradient set to add to (FIG. 3b) and reverse (FIG. 3c) the existing chirp. A slight dip is noted in FIG. 3b.
Figure 3B:
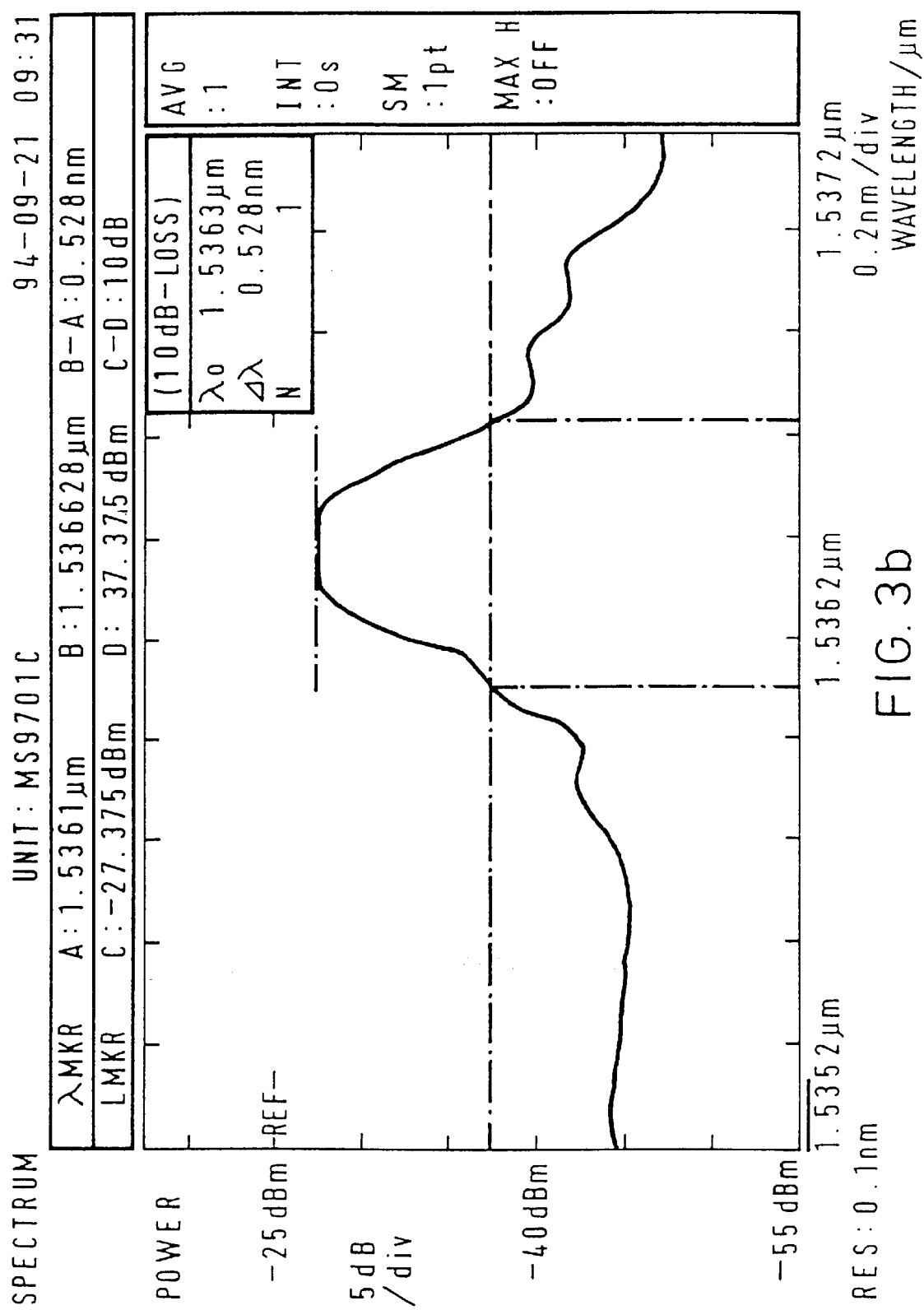
Figure 3C:
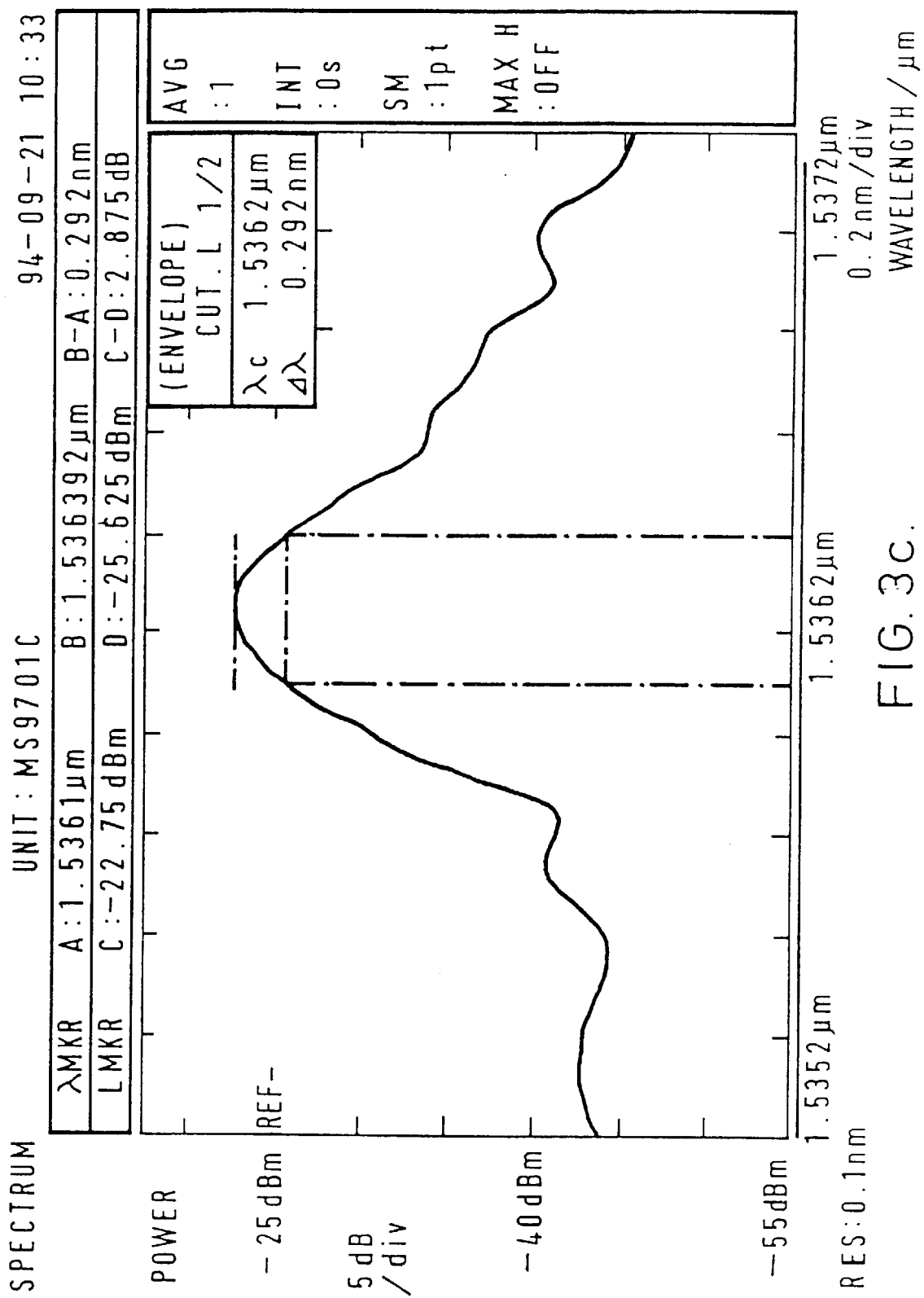
Figure 4C:
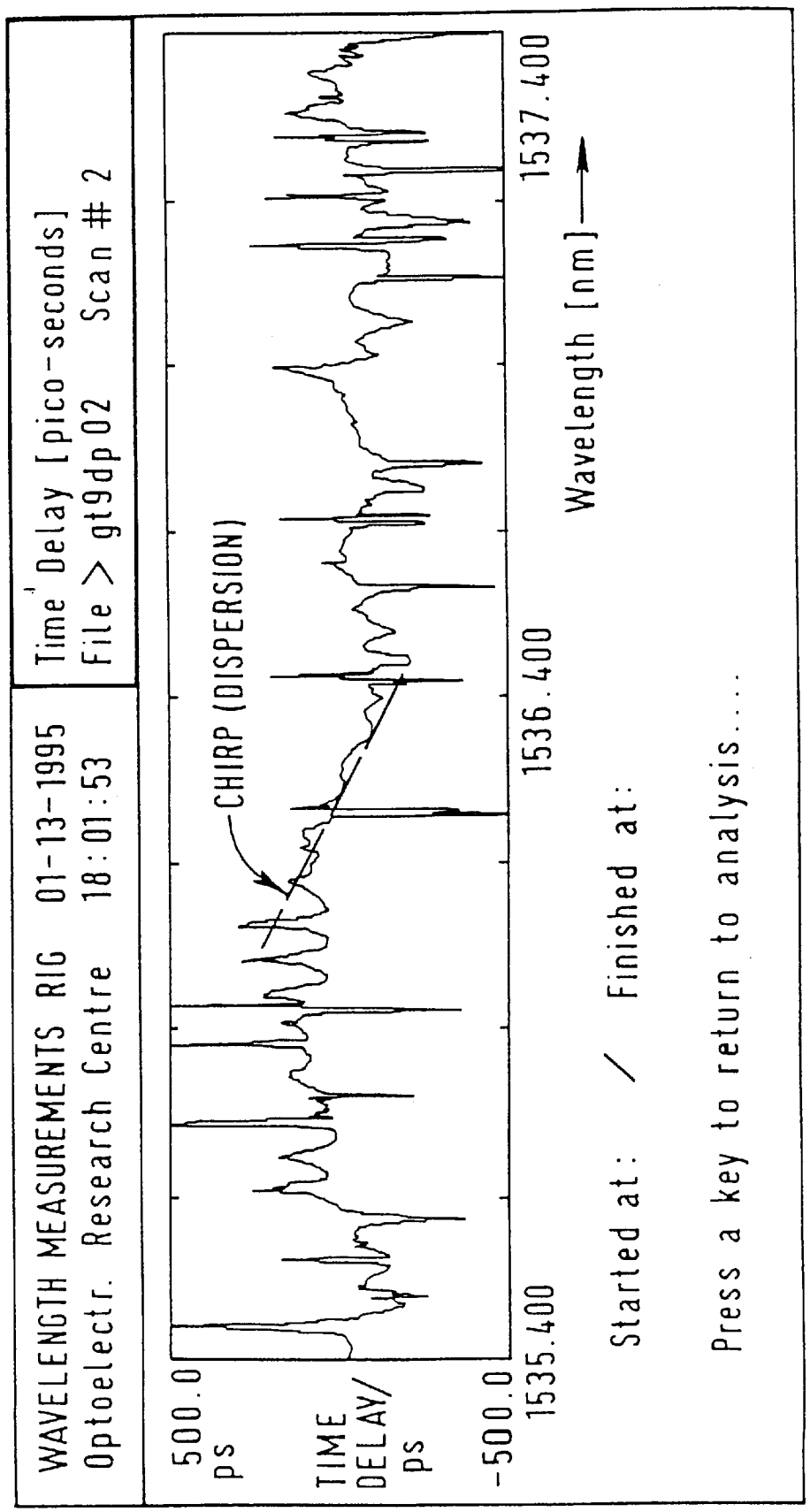

As stated, case b (i.e. as shown in FIGS. 3b and 4b) did not tend to give stable link performance and thus a temperature profile 100 indicated in FIG. 1 (case c, i.e. as indicated in FIGS. 3c and 4c) was employed. The centre wavelength of the chirped grating was also tuned to match the laser wavelength of 1536 nm. Once chirped, the grating reflectively reduced and thus the circulator-grating combination exhibited an insertion loss of 3.5 dB, but owing to its location at the output of the transmitter 20 and before the amplifier 30, this had a negligible effect on the link's power-budget.

Separate measurements involving compensation for the propagation of about 10 ps pulses over 50 and 100 km using this grating showed structure in the compressed pulses, indicating phase-distortion of the pulses and thus non-perfect compensation of the dispersion. However, owing to the non-transform-limited data (chirped source) an improvement in system performance was nevertheless obtained.

Figure 5A:
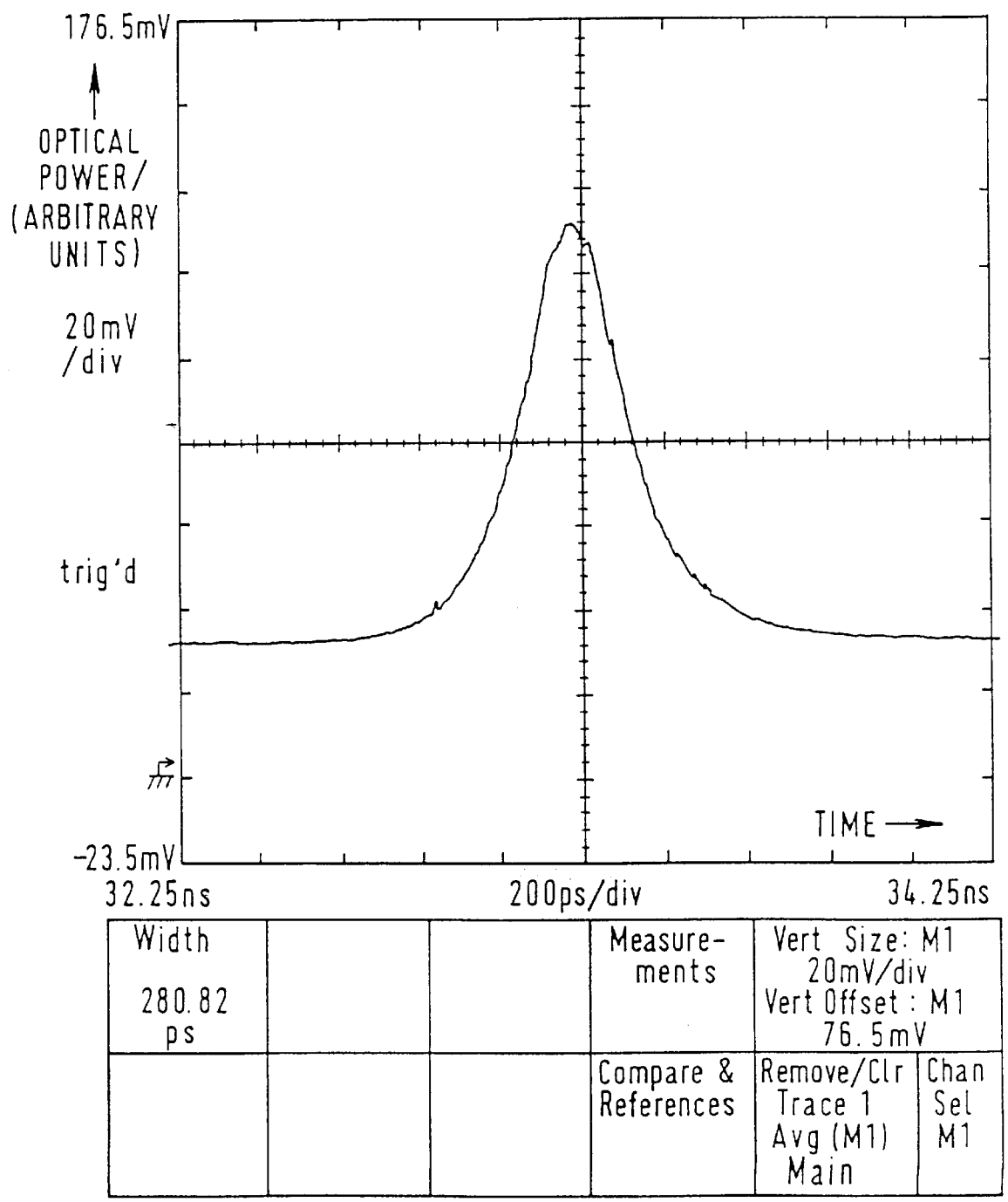
Figure 5B:
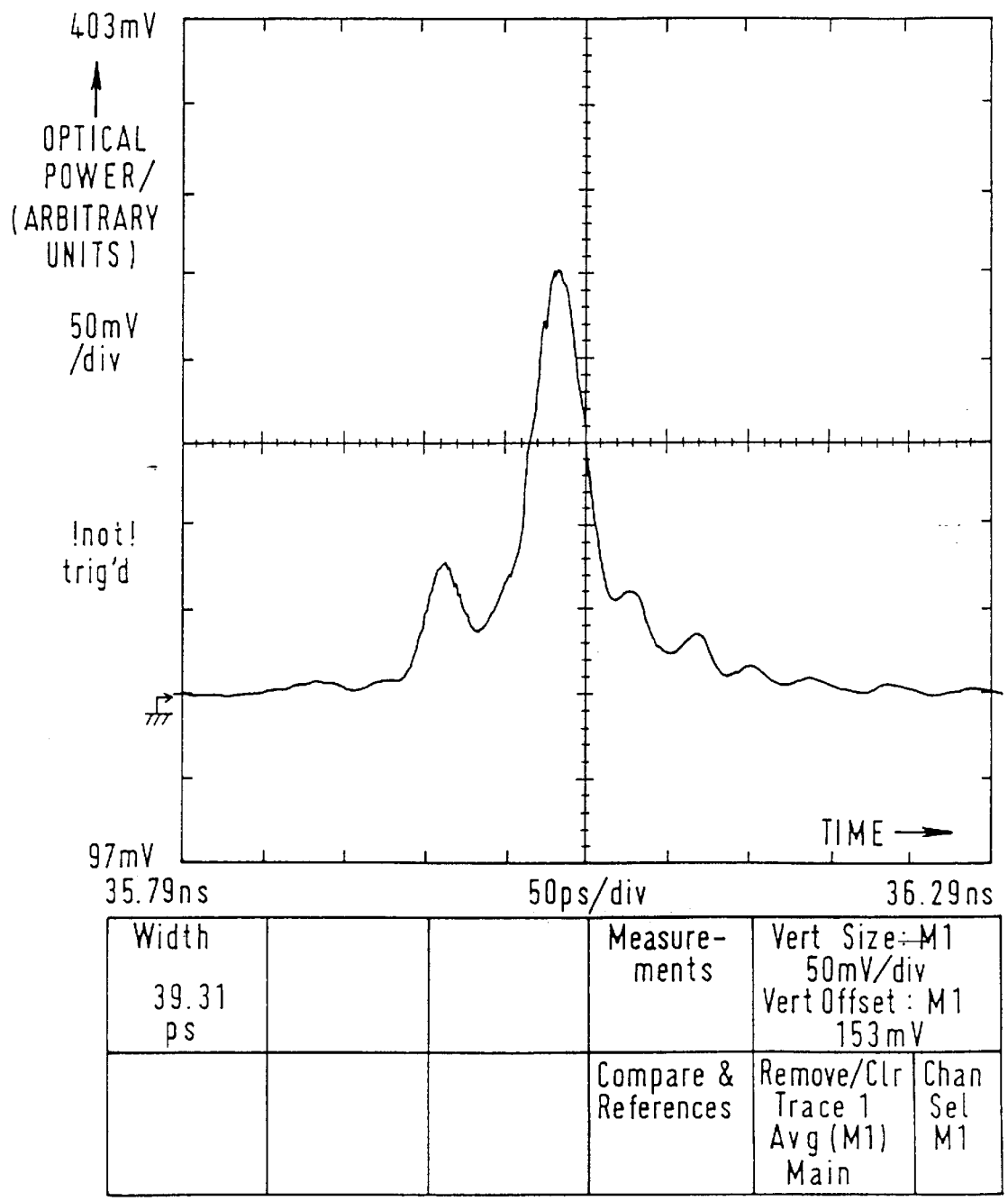

FIG. 5a shows a sampling oscilloscope trace of an approximately 10 ps, 0.318 nm spectral halfwidth pulse after propagation through 50 km of standard fibre. The pulse can be seen to have broadened to about 281 ps. After recompression with the grating, FIG. 5b, the pulse width is seen to be reduced to about 39 ps. However, structure can be seen, particularly on the leading edge of the pulse which might be detrimental at higher bit rates.

Figure 6:
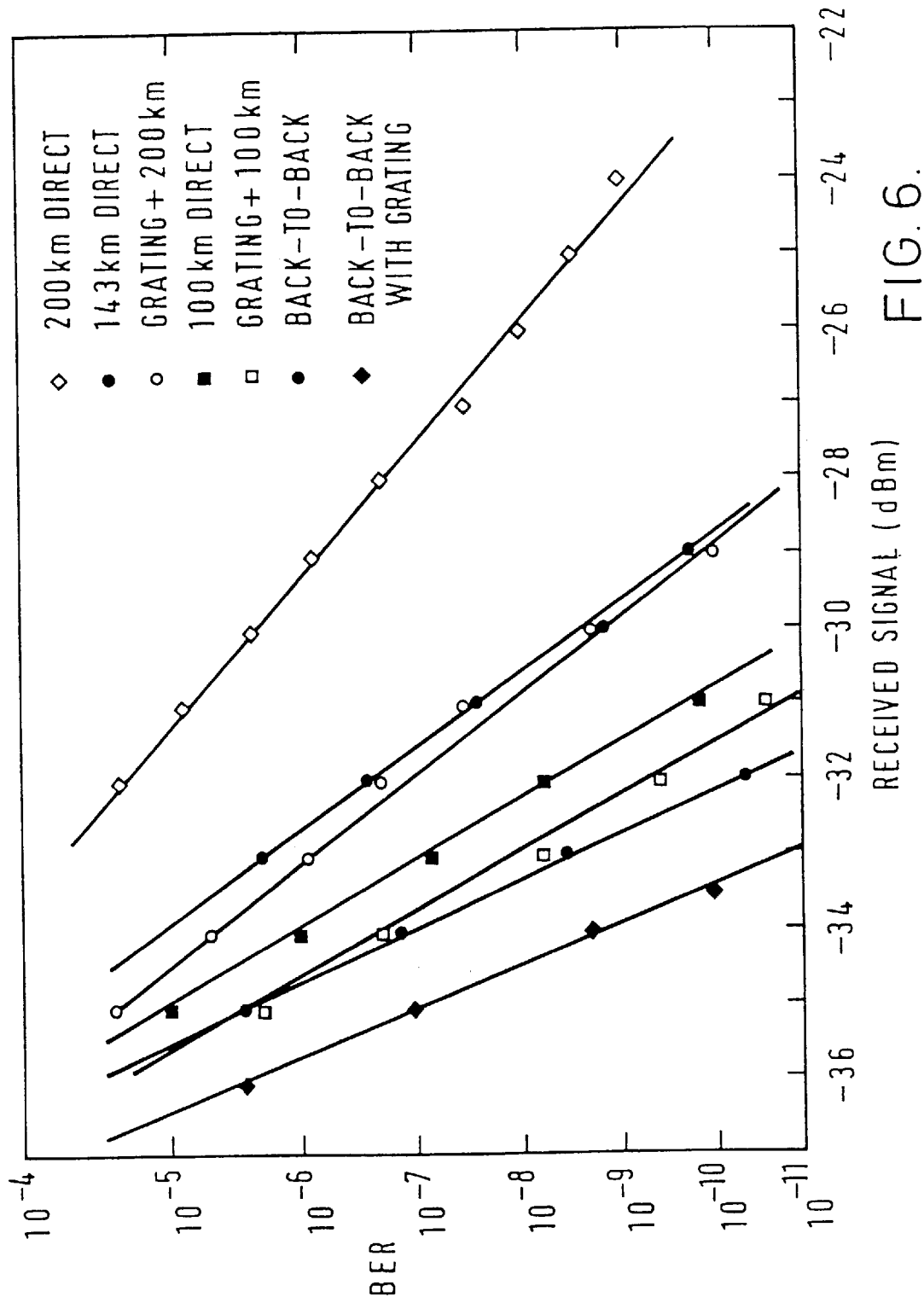

Bit-error-rate (BER) curves for the system are shown in FIG. 6. Data are given for back-to-back and transmission through 100, 143 and 200 km of standard fibre. Dispersion equalised curves, with the chirped grating included, are given for back-to-back and transmission through 100 and 200 km of fibre.

In the case of direct transmission, a back-to-back sensitivity of −32.7 dBm at a $10^{-9}$ BER is observed. At this error rate penalty of 1.3 dB was found at 100 km, increasing to 3.2 and 8.5 dB at 143 and 200 km, respectively.

Figure 7:
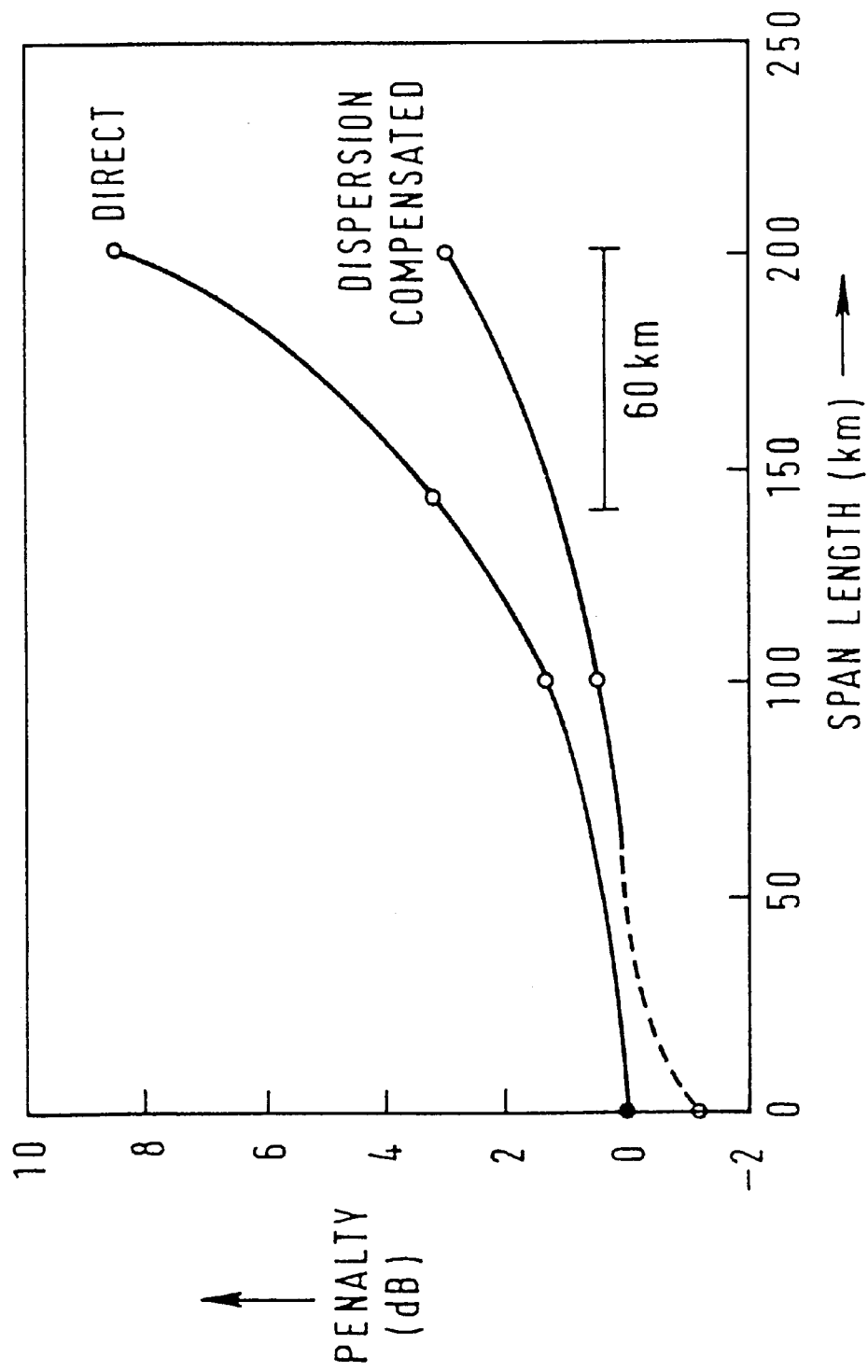
Figure 8C:
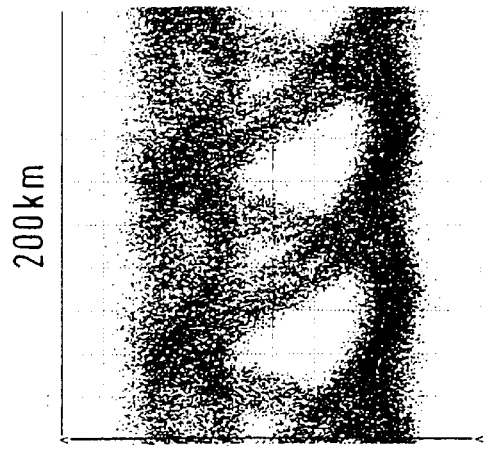
Figure 8F:
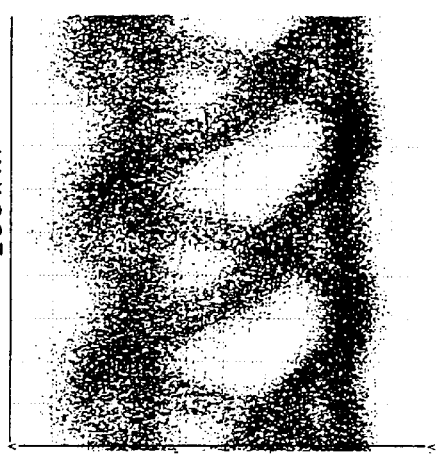
Figure 8B:
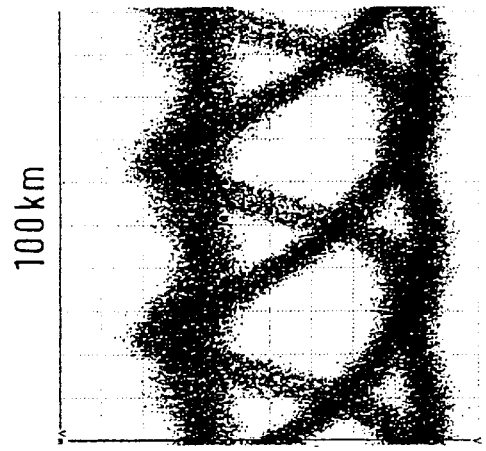
Figure 8E:
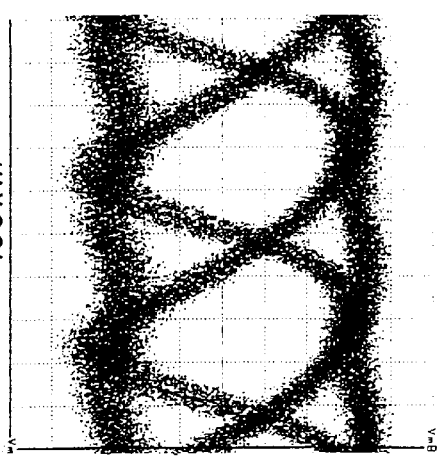
Figure 8A:
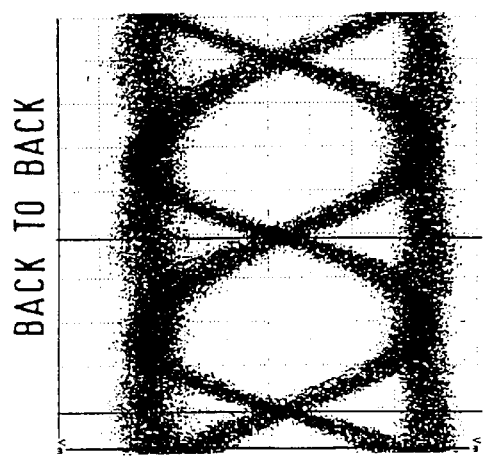
Figure 8D:
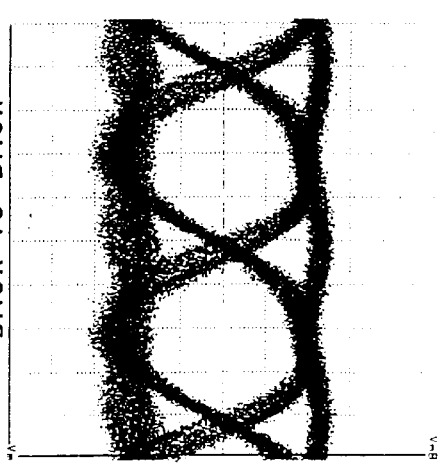

The increase in penalty with distance is shown again in FIG. 7. With the grating incorporated, the back-to-back sensitivity is actually improved by 1.2 dB, since the grating compresses the chirped-source pulses. The grating virtually eradicates the penalty at 100 km (0.5 dB) and significantly reduces the penalty at 200 km to only 3 dB. No floor in the error-rate curves was observed when using the grating.

The increase in penalty with distance in this case can be compared with the direct result in FIG. 7, where it can be seen that the grating dispersion is equivalent (but opposite in sign) to around 60 km of standard fibre. This result is in substantial agreement with the delay data illustrated in FIG. 4c.

Receiver eye diagrams are shown for various points in the system in FIG. 8. Although the interpretation of eye diagrams is always subjective, the skilled man will appreciate that the beneficial effect of using the grating 10 can be seen.

In summary, dispersion-compensation using a chirped fibre grating has been successfully demonstrated in a 200 km standard-fibre transmission experiment using a 2.5 Gbits$^{-1}$ 1.55 $\mu$m directly-modulated transmitter. The about 20 mm long, 0.3 nm chirped grating 10 effectively compensated for about 60 km of standard fibre (i.e. fibre having a dispersion zero around 1.3 $\mu$m and about 17 ps/nm.km dispersion around 1.55 $\mu$m), as anticipated. These results demonstrate that a non-uniformly chirped grating could provide significant improvements in current, directly modulated commercial systems.

Thus an approximately 20 mm (millimeter) long grating with substantially linear chirp, to give a 0.3 nm 3 dB bandwidth, substantially negates the dispersion of about 60 km of standard fibre. This allowed transmission through 200 km of standard fibre with a 3 dB penalty, which compares with an approximately 8.5 dB penalty without the compensation.

In summary, therefore, embodiments of the invention make use of a grating is connected (in a dispersion compensating fashion e.g. using an optical circulator) in an optical fibre link, where the grating is chirped by an amount providing at least partial compensation of the dispersion characteristics of the link, to provide an output signal from the link compatible with the sensitivity requirements of the receiver at the second end of the link. In particular, the embodiments of the invention, the optical signal at the output end of the link can be made to have a dispersion causing a penalty in sensitivity at the receiver of less than 8.5 decibels at a bit error rate of $10^{-9}$ in a link longer than 200 kilometers.

PUBLICATION REFERENCES

1. B. Wedding, B. Franz and B. Junginer, "Dispersion supported transmission at 10 Gbit/s via up to 253 km of standard single-mode fibre", Proc. ECOC, Sep. 12–16, 1993, paper TuC4.3.
2. R. I. Laming, D. J. Richardson, D. Taverner and D. N. Payne, "Transmission of 6 ps linear pulses over 50 km of standard fibre using midpoint spectral inversion to eliminate dispersion" IEEE Jnl. of Quantum Electronics, Vol. 30, 1994, pp. 2114–2119.
3. M. Onishi, H. Ishikawa, T. Kashiwada, K. Nakazato, A. Fukuda, H. Kanainori and M. Nishimura, "High performance dispersion-compensating fiber and its application to upgrading of 1.31 μm optimized system," Proc. ECOC, Sep. 12–16, 1993, paper WeC8.5.
4. R. Kashyap, S. V. Chernikov, P. F. McKee and J. R. Taylor, "30 ps chromatic dispersion compensation of 400 fs pulses at 100 Gbits/s in optical fibres using an all fibre photoinduced chirped reflection grating", Electronics Letters, Vol. 30, No. 13, pp. 1078–1080, 1994.
5. K. O. Hill, F. Bilodeau, B. Malo, T. Kitagawa, S. Theriault, D. C. Johnson, J. Albert and K. Takiguchi, "A periodic in-fibre Bragg gratings for optical fibre dispersion compensation", Proc. OFC'94, PD2, pp. 17–20.
6. J. A. R. Williams, I. Bennion, K. Sugden and N. J. Doran, "Fibre dispersion compensation using a chirped in-fibre grating", Electr. Lett., Vol 30 (12), 1994, pp. 985–987.
7. D. Garthe, W. S. Lee, R. E. Epworth, T. Bricheno and C. P. Chew, "Practical dispersion equalizer based on fibre gratings with a bit-rate length product of 1–6 TB/s.km" Proc. ECOC Vol. 4 (Postdeadline papers), pp. 11–14, Sep. 25–29, 1994.
8. B. Malo, K. O. Hill, S. Theriault, F. Bilodeau, T. Kitagawa, D. C. Johnson, J. Albert, K. Takiguchi, T. Kataoka and K. Hagimoto, "Dispersion compensation of a 100 km, 10 Gbits/s optical fiber link using a chirped in-fiber Bragg grating with a linear dispersion characteristic", ibid., pp 23–26.

What is claimed is:

1. An optical transmitter for use with an optical fibre transmission link, the transmitter comprising:
    a light source capable of direct or indirect modulation; and
    an optical amplifier;
    characterized by:
    a chirped grating to provide compensation for the dispersion characteristics of the link over the range of wavelengths of the modulated light source.
2. A transmitter according to claim 1, in which the amplifier is disposed between the grating and the transmission link.
3. A transmitter according to claim 2, in which the amplifier is operable in a saturation mode.
4. A transmitter according to any one of claims 1 to 3, in which the grating is a fibre grating.
5. A transmitter according to claim 4, in which the grating is a reflection fibre grating.
6. A transmitter according to claim 4, in which the chirped grating is formed by applying a temperature gradient to a portion of optical fibre on which a non-linear grating is impressed, the variation inducted by the temperature gradient acting against the non-linear variation of the impressed grating.
7. A transmitter according to claim 6, in which the temperature gradient at least negates the non-linear variation of the impressed grating, thereby generating a grating having a non-linear variation in the opposite sense to the impressed grating.
8. A transmitter according to any one of claims 1–3, comprising an optical circulator for receiving the modulated optical output of the light source, the circulator being connected to route the modulated optical output to the chirped grating and to route optical signals from the chirped grating to an output port;
    the optical amplifier being connected to receive optical signals from the output port of the optical circulator.
9. An optical fibre transmission system comprising:
    an optical transmitter according to any one of claims 1–3, the transmitter being operable to generate optical signals in dependence on input data;
    an optical fibre transmission line for propagating optical signals generated by the transmitter; and
    an optical receiver for converting optical signals output from the transmission link into corresponding electrical data signals.
10. An optical fibre transmission system comprising:
    an optical fibre transmission link; and
    an optical fibre amplifier disposed at an input end of the link;
    characterized by:
    a chirped grating disposed at the input end of the link, the chirped grating providing compensation against the dispersion characteristics of the link.
11. A system according to claim 10, in which the optical signal at a distal end of the link has a dispersion causing a penalty in sensitivity at the receiver of less than 8.5 decibels at a bit error rate of $10^{-9}$ in a link longer than 200 kilometers.
12. A system according to claim 10, in which the optical amplifier is operable in a saturation mode.
13. A system according to claim 10, comprising a variable attenuator connected between the output of the transmission link and the optical receiver.

* * * * *